(12) United States Patent
Wang et al.

(10) Patent No.: US 8,750,086 B2
(45) Date of Patent: Jun. 10, 2014

(54) DEVICE AND METHOD FOR TESTING DISC PLAYER

(71) Applicants: Hong Fu Jin Precision Industry (ShenZhen) Co., Ltd., Shenzhen (CN); Hon Hai Precision Industry Co., Ltd., New Taipei (TW)

(72) Inventors: Xiao-Li Wang, Shenzhen (CN); Hai-Feng Zhang, Shenzhen (CN); Hung-Lun Chiang, New Taipei (TW); Bing Zhou, Shenzhen (CN); Jun Liu, Shenzhen (CN); Na Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/912,225

(22) Filed: Jun. 7, 2013

(65) Prior Publication Data

US 2013/0329538 A1    Dec. 12, 2013

(30) Foreign Application Priority Data

Jun. 11, 2012 (CN) .......................... 2012 1 01903139

(51) Int. Cl.
*G11B 7/00* (2006.01)

(52) U.S. Cl.
USPC ................... 369/53.35; 369/53.41; 369/53.2; 369/53.1

(58) Field of Classification Search
None
See application file for complete search history.

(56) References Cited

U.S. PATENT DOCUMENTS

| 6,933,967 B2 * | 8/2005 | Doyle et al. ................. 348/189 |
| 2003/0063299 A1 * | 4/2003 | Cowan et al. ................. 358/1.9 |
| 2007/0097847 A1 * | 5/2007 | Ando et al. ................. 369/275.4 |
| 2007/0291046 A1 * | 12/2007 | Chuang et al. ................. 345/589 |

* cited by examiner

*Primary Examiner* — Muhammad N Edun
(74) *Attorney, Agent, or Firm* — Novak Druce Connolly Bove + Quigg LLP

(57) ABSTRACT

A test method includes the steps of providing a test optical disc stored data that is reproduced to display a plurality of images having a plurality of single colors, the plurality of single colors comprising a plurality of first single colors; providing a first timer that begins counting for a first predetermined time when the disc player begins to read the test optical disc; displaying test images according to the video signals generated by the disc player that read the test optical disc. The test method further includes the steps of detecting the color of the test images, determining whether the currently detected color is substantially the same as one of the first single colors after the first timer has timed out; determining that the read performance of the disc player is unsatisfactory if the currently detected color is substantially the same as one of first single colors.

18 Claims, 2 Drawing Sheets

DEVICE AND METHOD FOR TESTING DISC PLAYER

BACKGROUND

1. Technical Field

The disclosed embodiments relate to test devices and, particularly, to a device and a method for testing read performance of disc players.

2. Description of Related Art

A method for testing read performance of a disc player is that an operator observes data displayed on a display screen to determine whether there is an abnormality during the reading of the data by an optical disc. If the display screen fails to display images, the operator may determine that the read performance of the disc player is unsatisfactory. This test method needs the operator to continuously monitor the test, and over a period of time, the operator may feel tired, and errors or misjudgments may occur.

Therefore, there is room for improvement in the art.

BRIEF DESCRIPTION OF THE DRAWINGS

Many aspects of the embodiments can be better understood with reference to the drawing. The components in the drawing are not necessarily drawn to scale, the emphasis instead being placed upon clearly illustrating the principles of the present embodiments. Moreover, in the drawings, like reference numerals designate corresponding parts throughout two views.

DETAILED DESCRIPTION

Figure 1:
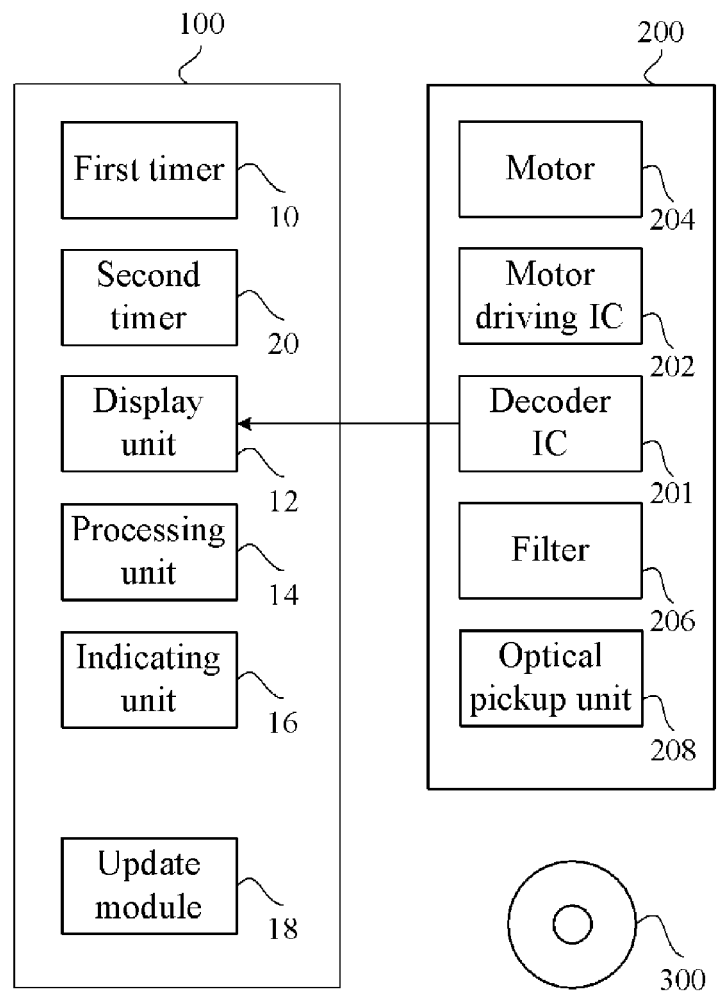
FIG. 1 is a block diagram showing a test device in accordance with one embodiment.

FIG. 1 is a test device 100 in accordance with one embodiment. The test device 100 tests read performance of a disc player 200. The disc player 200 reads a test optical disc 300 to generate video signals. The test optical disc 300 stores data that is reproduced to display a plurality of images having a plurality of single colors, for example white, red, green, blue, and black. Each image has a same predetermined display time, for example 2 seconds, as the other images. The plurality of single colors include a plurality of first single colors and a second single color.

The test device 100 includes a first timer 10, a display unit 12, a processing unit 14, and a second timer 20. When the disc player 200 begins to read the test optical disc 300, the processing unit 14 controls the first timer 10 to begin counting for a first predetermined time. In this embodiment, the first predetermined time is longer than the predetermined display time. The display unit 12 receives the video signals from the disc player 200 and displays the test images according to the video signals.

The processing unit 14 detects the color of the test images. In detail, the processing unit 14 calculates an average R-value, an average G-value, and an average B-value of the pixels in the display unit 12 to acquire the color of each of the test images.

The processing unit 14 further determines whether the currently detected color is substantially the same as one of the first single colors after the first timer 10 has timed out because the timed period has expired. In this embodiment, the test optical disc 300 stores data that is reproduced to display images having the plurality of first single colors before the elapse of the first predetermined time from a point in time when the data begins to be reproduced.

If the currently detected color is substantially the same as one of the first single colors, the processing unit 14 determines that the read performance of the disc player 200 is unsatisfactory.

The test optical disc 300 stores data that is reproduced to display image having the second single color when the second predetermined time from a point in time when the data begins to be reproduced has elapsed. And when the disc player 200 begins to read the test optical disc 300, the processing unit 14 controls the second timer 20 to begin counting for the second predetermined time.

The processing unit 14 further determines whether the currently detected color is substantially the same as the second single color when the second timer 20 has timed out because the timed period has expired. The processing unit 14 determines that the read performance of the disc player 200 is unsatisfactory if the currently detected color is not the same as the second single color. The processing unit 14 further determines that the read performance of the disc player 200 is satisfactory if the currently detected color is substantially the same as the second single color.

Furthermore, the test device 100 includes an indicating unit 16 and an update module 18. The processing unit 14 controls the indicating unit 16 to output an indication of abnormal read performance including reasons for the abnormalities and solutions if the processing unit 14 determines that the read performance of the disc player 200 is unsatisfactory. The update module 18 is connected to the internet for updating reasons for the abnormalities and solutions.

The disc player 200 includes a motor driving integrated circuit (IC) 202, a motor 204, a decoder IC 201, an optical pickup unit 208, and a filter 206 connected between the decoder IC and the optical pickup unit; the motor driving IC 202 transmits a drive signal to the motor 204, the motor 204 rotates the test optical disc 300 according to the drive signal. The decoder IC 201 transmits a control signal to the optical pickup unit 208 through the filter 206, the optical pickup unit 208 reads the test optical disc 300 in response to the control signal; the filter 206 filters the control signal. In this embodiment, the decoder IC is an MPEG decoder IC. In detail, the reasons for the abnormalities and the possible solutions includes malfunctions of the optical pickup unit 208 and the solutions of repairing or replacing the optical pickup unit 208; malfunctions of the filter 206 and the solutions of repairing or replacing the filter 206; malfunctions of the motor driving IC 202 and the solutions of repairing or replacing the motor driving IC 202; malfunctions of the decoder IC 201 and the solutions of repairing or replacing the decoder IC 201, damages to the optical pickup unit 208 by ESD and the solutions of replacing the damaged optical pickup unit 208.

Figure 2:
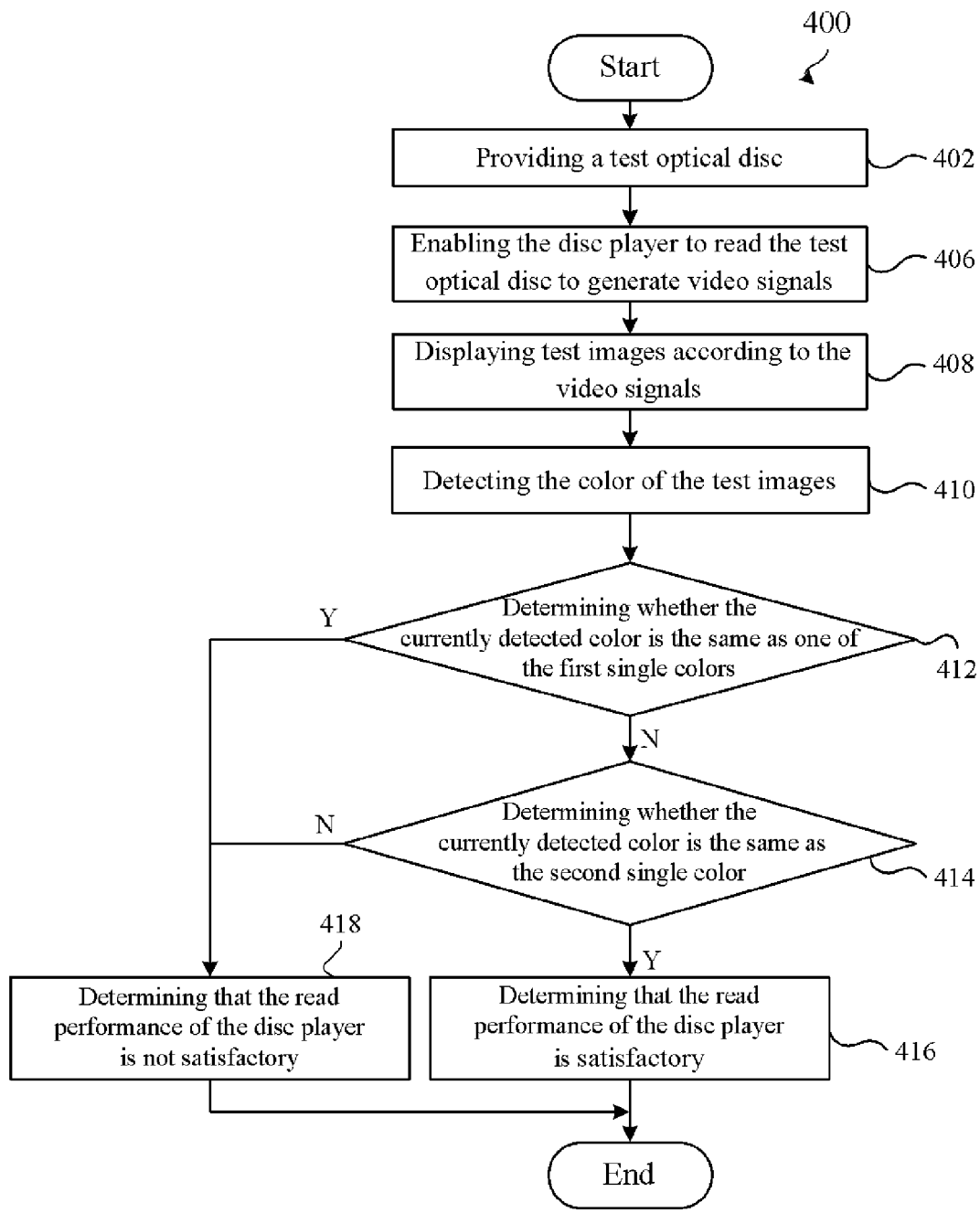
FIG. 2 is a flow chart showing a test method in accordance with one embodiment.

FIG. 2 is a test method 400 in accordance with one embodiment. The test method 400 is used for testing read performance of the disc player 200. The test method 400 is performed by the test device 100. The test device 100 further includes the first timer 10 and the second timer 20. The processing unit 14 is connected to the disc player 200. The processing unit 14 controls the first timer 10 to begin counting for the first predetermined time when the disc player 200 begins to read the test optical disc 300. The processing unit 14 further controls the second timer 20 to begin counting for the second predetermined time when the disc player 200 begins to read the test optical disc 300. The test method 400 includes the following steps.

Step 402: the test optical disc 300 stores data that is reproduced to display a plurality of images having a plurality of single colors, for example white, red, green, blue, and black. Each image has a same predetermined display time, for example 2 seconds, as the other images. The plurality of single colors include a plurality of first single colors and a second single color.

Step 406: the disc player 200 reads the test optical disc 300 to generate video signals.

Step 408: the display unit 12 receives the video signals from the disc player 200 and displays test images according to the video signals.

Step 410: the processing unit 14 detects the color of the test images. In detail, the processing unit 14 calculates an average R-value, an average G-value, and an average B-value of the pixels in the display unit 12 to acquire the color of each of the test images.

Step 412: the processing unit 14 determines whether the currently detected color is substantially the same as one of the first single colors after the first timer 10 has timed out because the timed period has expired. If the currently detected color is substantially the same as one of the first single colors, the process goes to step 418; Otherwise, the process goes to step 414. In this embodiment, the test optical disc 300 stores data that is reproduced to display images having the first single colors before the elapse of the first predetermined time from a point in time when the data begins to be reproduced.

Step 414: The processing unit 14 determines whether the currently detected color is substantially the same as the second single color when the second timer 20 has timed out. If the currently detected color is substantially the same as the second single color, the process goes to step 416. Otherwise, the process goes to step 418. In this embodiment, the test optical disc 300 stores data that is reproduced to display image having the second single color when the second predetermined time from a point in time when the data begins to be reproduced has elapsed.

Step 416: the processing unit 14 determines that the read performance of the disc player 200 is satisfactory.

Step 418: the processing unit 14 determines that the read performance of the disc player 200 is unsatisfactory.

Furthermore, the processing unit 14 controls the indicating unit 16 to output an indication of abnormal read performance including reasons for the abnormality and possible solutions if the processing unit 14 determines that the read performance of the disc player 200 is unsatisfactory. The update module 18 is connected to the internet for updating the reasons for the abnormalities and possible solutions.

As described above, in detail, the reasons for the abnormalities and the possible solutions includes malfunctions of the optical pickup unit 208 and the solutions of repairing or replacing the optical pickup unit 208; malfunctions of the filter 206 and the solutions of repairing or replacing the filter 206; malfunctions of the motor driving IC 202 and the solutions of repairing or replacing the motor driving IC 202; malfunctions of the decoder IC 201 and the solutions of repairing or replacing the decoder IC 201, damages to the optical pickup unit 208 by ESD and the solutions of replacing the damaged optical pickup unit 208.

The test device 100 and the test method 400 can carry out a test of the read performance of the disc player 200 automatically, which provides greater convenience for users.

Alternative embodiments will become apparent to those skilled in the art without departing from the spirit and scope of what is claimed. Accordingly, the present disclosure should not be deemed to be limited to the above detailed description, but rather only by the claims that follow and the equivalents thereof.

What is claimed is:

1. A test device for testing read performance of a disc player, the disc player reading a test optical disc to generate video signals, the test optical disc storing data that is reproduced to display a plurality of images having a plurality of single colors; the plurality of single colors comprise a plurality of first single colors, the test device comprising:
   a first timer;
   a display unit for displaying test images according to the video signals received from the disc player; and
   a processing unit, wherein the processing unit is configured to control the first timer to begin counting for a first predetermined time when the disc player begins to read the test optical disc; the processing unit is further configured to detect the color of the test images, determine whether the currently detected color is substantially the same as one of the first single colors after the first timer has timed out;
   wherein the processing unit determines that the read performance of the disc player is unsatisfactory if the currently detected color is substantially the same as one of the first single colors; the test optical disc stores data that is reproduced to display images having the first single colors before the elapse of the first predetermined time from a point in time when the data begins to be reproduced.

2. The test device of claim 1, further comprising a second timer, wherein the processing unit is further configured to control the second timer to begin counting for a second predetermined time when the disc player begins to read the test optical disc; the plurality of single colors further comprise a second single color, the test optical disc stores data that is reproduced to display image having the second single color when the second predetermined time from a point in time when the data begins to be reproduced has elapsed, the processing unit further determines whether the currently detected color is substantially the same as the second single color when the second timer has timed out; the processing unit determines that the read performance of the disc player is unsatisfactory if the currently detected color is not the same as the second single color.

3. The test device of claim 2, wherein the processing unit further determines that the read performance of the disc player is satisfactory if the currently detected color is substantially the same as the second single color.

4. The test device of claim 2, wherein each image having the single color has a same predetermined display time, the second predetermined time is longer than the first predetermined time, the first predetermined time is longer than the predetermined display time.

5. The test device of claim 1, wherein the processing unit calculates an average R-value, an average G-value, and an average B-value of the pixels in the display unit to acquire the color of each of the test images.

6. The test device of claim 1, further comprising an indicating unit, wherein the processing unit controls the indicating unit to output an indication of abnormal read performance comprising reasons for the abnormalities and solutions if the processing unit determines that the read performance of the disc player is unsatisfactory.

7. The test device of claim 6, wherein the disc player comprises a motor driving integrated circuit (IC), a motor, a decoder IC, an optical pickup unit, and a filter connected between the decoder IC and the optical pickup unit; the motor driving IC transmits a drive signal to the motor, the motor rotates the test optical disc according to the drive signal; the decoder IC transmits a control signal to the optical pickup unit through the filter, the optical pickup unit reads the test optical disc in response to the control signal; and the filter filters the control signal.

8. The test device of claim 7, wherein the reasons for the abnormalities and the solutions for solving the abnormalities comprises malfunctions of the optical pickup unit and the solutions of repairing or replacing the optical pickup unit; malfunctions of the filter and the solutions of repairing or replacing the filter; malfunctions of the motor driving IC and the solutions of repairing or replacing the motor driving IC; malfunctions of the decoder IC and the solutions of repairing or replacing the decoder IC; and damages to the optical pickup unit by ESD and the solutions of replacing the damaged optical pickup unit.

9. The test device of claim 8, further comprising an update module, wherein the update module is connected to the internet for updating reasons for the abnormalities and solutions.

10. A test method for testing read performance of a disc player, the disc player reading a test optical disc to generate video signals, the test method comprising the steps of:
providing the test optical disc stored data that is reproduced to display a plurality of images having a plurality of single colors, the plurality of single colors comprising a plurality of first single colors;
providing a first timer that begins counting for a first predetermined time when the disc player begins to read the test optical disc;
displaying test images according to the video signals received from the disc player;
detecting the color of the test images, determining whether the currently detected color is substantially the same as one of the first single colors after the first timer has timed out; and
determining that the read performance of the disc player is unsatisfactory if the currently detected color is substantially the same as one of first single colors, wherein the test optical disc stores data that is reproduced to display images having the first single colors before the elapse of first predetermined time from a point in time when the data begins to be reproduced.

11. The test method of claim 10, further comprises the steps of:
providing a second timer that begins counting for a second predetermined time when the disc player begins to read the test optical disc; wherein the test optical disc stores data that is reproduced to display image having the second single color when the second predetermined time from a point in time when the data begins to be reproduced has elapsed;
determining whether the currently detected color is substantially the same as the second single color when the second timer has timed out; and
determining that the read performance of the disc player is unsatisfactory if the currently detected color is not the same as the second single color;
wherein the step of "determining whether the currently detected color is substantially the same as the second single color" is performed if the currently detected color is not the same as one of first single colors.

12. The test method of claim 11, further comprising the steps of:
determining that the read performance of the disc player is satisfactory if the currently detected color is substantially the same as the second single color.

13. The test method of claim 10, wherein the single color of each image is white, red, green, blue, or black.

14. The test method of claim 10, wherein the processing unit calculates an average R-value, an average G-value, and an average B-value of the pixels in the display unit to acquire the color of each of the test images.

15. The test method of claim 11, wherein the second predetermined time is longer than the first predetermined time.

16. The test method of claim 10, further comprising the steps of:
outputting an indication of abnormal read performance comprising reasons for the abnormalities and solutions if it is determined that the read performance of the disc player is unsatisfactory.

17. The test method of claim 16, wherein the reasons for the abnormalities and the solutions for solving the abnormalities comprises malfunctions of an optical pickup unit of the disc player and solutions of repairing or replacing the optical pickup unit; malfunctions of a motor driving integrated circuit (IC) of the disc player and solutions of repairing or replacing the motor driving IC; malfunctions of a filter of the disc player and solutions of repairing or replacing the filter, wherein the filter is connected between the optical pickup unit and the motor driving IC; malfunctions of a decoder IC of the disc player and solutions of repairing or replacing the decoder IC; and damages to the optical pickup unit by ESD and solutions of replacing the damaged optical pickup unit.

18. The test method of claim 16, further comprising the steps of:
connecting the disc player to the internet for updating reasons for the abnormalities and solutions.

* * * * *